(12) United States Patent
Fini, Jr.

(10) Patent No.: US 6,387,007 B1
(45) Date of Patent: May 14, 2002

(54) ELECTROMECHANICAL VEHICLE REGENERATION SYSTEM

(76) Inventor: Anthony W. Fini, Jr., 4273 Mundy St., Blasdell, NY (US) 14219

( * ) Notice: Subject to any disclaimer, the term of this patent is extended or adjusted under 35 U.S.C. 154(b) by 0 days.

(21) Appl. No.: 09/519,639

(22) Filed: Mar. 6, 2000

Related U.S. Application Data

(63) Continuation-in-part of application No. 09/220,109, filed on Dec. 23, 1998, now abandoned, which is a continuation-in-part of application No. 08/788,549, filed on Jan. 24, 1997, now abandoned.
(60) Provisional application No. 60/068,857, filed on Dec. 29, 1997.

(51) Int. Cl.$^7$ ............................. F16H 3/74; F16H 33/08
(52) U.S. Cl. ........................... 475/268; 475/5; 180/65.4
(58) Field of Search ........................... 475/268, 5, 190, 475/9, 8; 180/65.1–65.6

(56) References Cited

U.S. PATENT DOCUMENTS

| | | | | |
|---|---|---|---|---|
| 1,671,033 A | * | 5/1928 | Kimura ................. | 180/65.2 X |
| 3,566,717 A | * | 3/1971 | Berman et al. ........ | 180/65.2 X |
| 3,799,284 A | * | 3/1974 | Hender ....................... | 180/65.2 |
| 4,423,794 A | * | 1/1984 | Beck ...................... | 180/65.2 X |
| 5,120,282 A | * | 6/1992 | Fjallstrom ...................... | 475/5 |
| 5,327,987 A | * | 7/1994 | Abdelmalek ............... | 180/65.2 |
| 5,489,001 A | * | 2/1996 | Yang ......................... | 180/65.2 |
| 5,492,189 A | * | 2/1996 | Kriegler et al. ............ | 180/65.2 |
| 5,495,906 A | * | 3/1996 | Furutani ..................... | 180/65.2 |
| 5,558,595 A | * | 9/1996 | Schmidt et al. ................ | 477/3 |
| 5,713,425 A | * | 2/1998 | Buschhaus et al. ......... | 180/65.2 |
| 5,839,533 A | * | 11/1998 | Mikami et al. ............. | 180/165 |
| 5,856,709 A | * | 1/1999 | Ibaraki et al. ................ | 290/45 |
| 5,887,670 A | * | 3/1999 | Tabata et al. .............. | 180/65.2 |
| 6,059,064 A | * | 5/2000 | Nagano et al. ............. | 180/243 |

* cited by examiner

Primary Examiner—Sherry Estremsky
Assistant Examiner—Tisha D. Lewis

(57) ABSTRACT

A high output transmission comprising a planetary drive with input driven by an electric motor, arranged as a variable speed translator to deliver power and speed to the wheels of the vehicle, with vehicle movement being controlled by automatically increasing and decreasing gear ratios in cooperation with variations in electric motor speed and comprising a generator arranged to provide regenerative power to the power supply during automatic imposition of scheduled resistance of rotation which enables change in output gear ratio.

23 Claims, 7 Drawing Sheets

ELECTROMECHANICAL VEHICLE REGENERATION SYSTEM

This is a continuation in part of U.S. Ser. No. 09/220,109, filed Dec. 23, 1998 now abandoned which is a CIP of U.S. Ser. No. 08/788,549, filed Jan. 24, 1997 now abandoned and Provisional Application No. 60/068,857 filed Dec. 29, 1997.

BACKGROUND OF THE INVENTION

Electric motor powered wheeled vehicles are well known in the art and have sparked continued interest as an alternate power source for human transport. One problem in the development of electric vehicles suitable for modern demands is the difficulty of producing a vehicle of reasonable cost, size and performance using available electric power storage systems.

Electric powered vehicles compete with internal combustion powered vehicles as transportation and in view of such must provide a great many of the conveniences of operation found using modern internal combustion vehicles. Thus, it is considered necessary for general acceptance of an electric powered vehicle that it have the ability to operate at reasonable highway speeds, e.g. 50–70 mph, have reasonable operational longevity between down time charging, and must have reasonable power and vehicle response over typical roadway terrain and conditions which might be encountered.

Electric vehicle speeds of 50–70 mph have not been a significant problem to attain, however attaining and maintaining such speeds, while achieving reasonable operational longevity, has been problematic. To solve such problem, electric vehicles have been fitted with diverse electricity generating and storage means. For example, solar generators, wind generators and even small gasoline, natural gas and the like fueled generators have been fitted to electric vehicles to generate electricity as it is being used and replenish and extend the life of battery systems currently used to power electric vehicles. Improved battery systems having deep cycle charges have been developed, but the cost and weight of sufficient numbers of such batteries to extend range have created further problems which negate the acceptance of electric vehicles as a popular transportation choice.

In an effort to extend the operational range of electric powered vehicles, hybrid arrangements of electric motors with alternate fuel engines have been proposed to be added to electric powered vehicles. By the term alternate fuel engine is meant engines which are fueled by gasoline, diesel, natural gas, hydrogen, compressed air, steam and the like such as internal combustion engines, turbines and the like. In such arrangement an electric motor is generally arranged as the primary vehicle drive, powered by a bank of batteries, with the vehicle additionally containing an alternate fuel engine which drives a generator enabled to regenerate electric battery storage during and/or intermittent with power use by the electric motor. An advantage of such hybrid arrangements is that small horsepower alternate fuel engines can be used for electricity replenishment, which can be enabled at constant, energy efficient speeds to use small quantities of fuel to regenerate electricity and thus significantly increase the operational range of the electric powered vehicle. Since most calculations for vehicle fuel efficiency are concerned with fuel burned on board the vehicle, such arrangements are viewed as being very efficient in miles per gallon of fuel consumed.

In some hybrid embodiments, the alternate fuel engine regenerating arrangement can be shifted to directly engage the drive train of the vehicle, typically in emergency situations. Such enablement is usually provided for situations when stored electric power is too low to power the electric motor drive of the vehicle, but since the alternate fuel engine is generally of low horsepower, they are generally inadequate for normal drive use.

In the operation of a wheeled vehicle for general transport, the driving event is one where the vehicle is intermittently powered, braked and otherwise caused to change the speed and force which must be delivered to the drive wheels of the vehicle.

An object of the present invention is to use various changes in the vehicular driving event to replenish and extend storage battery systems powering an electric vehicle.

Another object of the present invention is to provide an improved system for regenerating batteries in an electric motor powered vehicle, using energy means which is otherwise lost during changes in the driving experience.

A still further object of the invention is provide a simple, efficient and inexpensive transmission for varying speed and power from an electric motor drive source to the wheels, which can be conveniently arranged in enabling a iregenerating system for extending the life of a storage battery system.

Yet another object of the invention is to provide a transmission means to enable convenient and efficient hybrid embodiments of an electric motor drive vehicle.

These and other objects will become apparent from the following recitation of the invention.

SUMMARY OF THE INVENTION

In its simplest mode, the present invention combines a simple, efficient and inexpensive transmission suitable for varying the speed and power delivered to drive wheels of a vehicle, with a power regeneration loop arranged to utilize energy otherwise wasted during the driving experience.

In a preferred arrangement of the invention, a high output transmission comprising a planetary drive with means connected to an electric motor, is arranged as a variable speed translator within a vehicle drive train, with vehicle power and speed being enabled by automatically increasing and decreasing gear ratios in cooperation with variations in electric motor speed and output power needs.

The high output transmission of the invention comprises a planetary drive means which utilizes an incrementally scheduled means to resist the rotation of an idler wheel member for automatically transferring power in infinite increments through a defined range of gear ratios to and from opposing output and input drive means of the planetary.

In one arrangement of the invention, an electric motor, powered by a battery storage system, drives a planetary input member which in turn has an output member arranged to drive a vehicle wheel. The electric motor driven input member is in planetary arrangement with an output member and an idler member, with variable resistance of rotation being imposed upon the idler member to define the rotation and geared ratio of the output member in respect to the driven input member. The arrangement includes a generator in an arrangement which imposes incremental scheduled resistance of rotation upon the idler member, with the resistance of rotation being sufficient to enable translation of electric motor rotation to the output drive and accordingly the vehicle wheel(s). The generator arrangement is such as to produce regenerative electricity for input to the battery storage system as a functional consequence of resistance of rotation of the idler member, and stops producing regenerative electricity when rotation of the idler member is stopped.

In a typical sequence of driving events to initiate movement of a vehicle in such arrangement, the electric motor provides a selected rotational speed to the input member which rotates an idler member. The idler member is incrementally restricted by the generator arrangement to automatically provide incrementally increasing output to the wheels, infinitely through a defined range of gear ratios, up to a scheduled intermediate state gear ratio or to the highest transmission gear ratio of the transmission. The generator is arranged to produce power in accord with the rotation of the idler member, intermittently or continuously generating electricity for replenishing a battery storage system.

In such arrangement of the invention, the vehicle maintains speed as determined by the selected speed of the electric motor and the transmission gear ratio automatically selected through the planetary arrangement in accord with the resistance of the vehicle to motion. Thus, at any selected motor speed wherein resistance to movement of the vehicle is such that the planetary transmission gear ratio is less than at its highest ratio, the idler member rotates and enables generation of electricity for replenishment of the battery storage system.

For example, when a vehicle is traveling in a generally level plane, with the electric motor at a selected speed and the transmission operating at an input:output gear ratio other than the highest ratio attainable, the idler is rotating and the generator is enabled for generation of power to the battery storage system. When vehicle inertia tends to increase the vehicle speed, as for example going downhill, with no change in selected speed of the electric motor, the transmission automatically incrementally moves downward to a lower gear ratio which increases the rotation of the idler member and concurrently changes the rate and amount of generation of electricity by the generator, continuing through the end of that inertial experience of the vehicle.

If the driver increases vehicle speed by increasing the selected speed of the electric motor, the transmission automatically incrementally moves from a higher to a lower gear ratio with concurrent idler member rotational increase and changed generation of electricity until a steady maintained speed is reached as defined by the new selected motor speed at either the maximum gear ratio attainable or at a steady state intermediate ratio. If the vehicle is caused to decrease speed, by the driver decreasing the selected speed of the electric motor, the transmission automatically incrementally moves downward through its defined gear ratio changing generation of electricity by increasing idler member rotation, continuing until the vehicle is stopped with power to the electric motor disengaged. Thus, electrical regeneration occurs intermittently and/or continuously, throughout the driving experience, at rates commensurate with intermittent and incremental changes in vehicle speed.

Such arrangement is particularly suitable for use in hybrid embodiments. In one hybrid embodiment, a vehicle is enabled for electric motor drive of one axle and/or wheel with another axle and/or wheel being enabled for drive by an alternate fuel engine. Thus, for example an electric motor having a through-put shaft extending from both ends thereof, or two independent electric motors, is mounted between two front or rear wheels of a vehicle, each shaft end being connected to the input of a planetary transmission of the invention and each output of the respective transmissions being connected to drive a wheel. The idler members of both transmissions are arranged to drive a generator. When the electric motor is engaged to drive the vehicle, the input shafts of both planetary transmissions are rotated and both wheels of the vehicle are driven with regeneration as before described. Since planetary arrangements are on both sides of the electric motor it can be used on a rear or front axle, with differences in front wheel speed occasioned by parallel steering radii being automatically compensated through the variable ratio of the independently functioning planetary transmissions.

When the electric motor is not engaged, as for example a wheel and/or wheels of another axle being driven by the alternate fuel engine, the electric motor is braked from turning but the wheels are still engaged with the moving vehicle and turning idler members are regenerating the bank of storage batteries. When both the alternate fuel engine and the electric motor are engaged, the vehicle functions as a true 4 wheel drive vehicle. This embodiment has particular military interest in that it can provide a vehicle with an easily engaged or disengaged stealth capability, alternate independent emergency power supply enablement through an alternate fuel engine, hybrid battery regeneration and convenient 4 wheel and/or alternate axle 2 wheel drive selection.

In another hybrid embodiment, the planetary transmission of the invention is arranged between an alternate fuel engine and an electric motor along a drive train of the vehicle. In such arrangement, an electric motor having a through-put shaft extending from both ends has one shaft end connecting to the vehicle wheel drive, and the other shaft end connecting to a first input/output shaft of a planetary transmission of the invention. A second input/output shaft of the transmission is connected to the driven output shaft of an alternate fuel engine, the idler member is in enabling arrangement with a generator, and the alternate fuel engine may be in further enabling arrangement with another generator.

In such hybrid arrangement, the alternate fuel engine driven output shaft, input/output shafts of the transmission and electric motor shaft, are preferably arranged with rotating shafts along about a common axis and enabled for independent and/or cooperative engagement of both the electric motor and alternate fuel engine in the tasks of driving the vehicle wheels and/or regeneration of battery storage banks. Thus, in one preferred embodiment, the electric motor provides the primary vehicle driving force, with an alternate fuel engine operating at an efficient constant idle speed to regenerate stored electricity and/or directly supply power to the electric motor on an as needed basis.

With the electric motor under power, both ends of the motor shaft provide power output, one end to the wheels of the vehicle, the other end to a first input/output shaft of the planetary transmission. Whether or not the rotation of the electric motor shaft is from electric powered enablement or inertial movement of the vehicle wheels, the connection to the planetary transmission enables the idler member to rotate and generate electricity. Restraining the idler member from rotation enables the rotation of the second input/output shaft of the planetary to the engine.

The driven shaft of the internal combustion engine is arranged to provide output to a second input/output shaft of the planetary. Input of power from the internal combustion engine to the second input/output shaft also enables the idler member to rotate and generate electricity, and when the idler member is restrained, enables the rotation of the first input/output shaft of the planetary transmission.

Such hybrid arrangement provides a multiplicity of different adaptations within a hybrid powered vehicle for both efficiency and fuel preservation. For example, in one adaptation hard connections may be used among the shafts of the alternate fuel engine, planetary transmission and electric motor, such that with appropriate selection of transmission ratios and coordinated restraint of the idler member, the drive shaft of alternate fuel engine may be enabled to rotate at a constant speed powering a generator independent from the planetary transmission and be engaged and disengaged to assist the rotation of the electric motor by varying the restraint upon the idler member. In another example, an alternate fuel engine can be increased in speed from a normally constant speed, through a kick-down enablement position of an accelerator pedal, which is coordinated with restraint on the idler member.

In another adaptation, clutch means may be provided for controlled engagement among the shafts of the alternate fuel engine and the planetary transmission and/or the electric motor and the planetary transmission. For example, clutch means interposed among the drive shaft of the alternate fuel engine and the planetary transmission enables operational interruption of the alternate fuel engine from the electric motor/planetary transmission/vehicle drive system; while clutch means interposed among the planetary transmission and the electric motor enables operational interruption of the electric motor/vehicle drive system from the planetary transmission/alternate fuel engine system. Positioning of the clutch means between the alternate fuel engine and the planetary transmission is generally preferred to enable different gear ratios than possible through the planetary transmission and/or to provide improved operation of the vehicle when powered solely by the alternate fuel engine.

Positioning the clutch means between the planetary transmission and the electric motor is generally preferred when the vehicle is to be primarily electric motor driven, with regeneration dependent primarily upon the alternate fuel engine. In such mode, secondary regeneration is generally also connected downstream from the transmission toward the driven wheel for operation with any transmission and/or a further planetary transmission.

Multiple additional hybrid adaptations of the invention are apparent, such as for example the use of an AC electric motor, with or without a significant invertible storage battery presence, wherein the alternate fuel engine directly generates AC current for use by the electric motor and interacts with the planetary transmission of the invention to generate DC current for a storage battery utility and/or to assist the AC motor during the driving experience to provide improved vehicle driving performance. Such arrangement enables use of AC motors which are resistant to starting under load. For example AC motors have significant power-draw at start-up and three phase motors are generally not considered practical for vehicle embodiments because of initial start-up concerns. In a hybrid embodiment as contemplated in the present invention, wherein the alternate fuel engine is enabled to assist start up of an electric motor, power-draw by the AC motor is significantly reduced and three phase motors become practical for use. Indeed, such arrangement even contemplates the combination of low horsepower alternate fuel engines driving an AC generator, specifically including three phase AC generating means, which is arranged to directly power an AC operating motor specifically including a three phase motor. Such direct power arrangement obviates the use of large banks of storage batteries and enables the use of a small battery storage bank which enable other vehicle needs and/or can be tapped for reserve storage on an intermittent as needed basis and/or which are recharged through operation of the on-board generating means.

It is believed that under typical driving conditions wherein the vehicle is caused to intermittently stop, start, slow down and increase speed in accord with terrain and/or traffic conditions, that the regenerative storage battery arrangement of the invention without hybrid enablement can increase range of an electric vehicle from about 20 to greater than about 70 percent as compared to non-regenerative systems, and that embodiments with hybrid enablement can provide generally unlimited range and even improved vehicle driving performance.

DETAILED DESCRIPTION OF THE INVENTION

Figure 1:
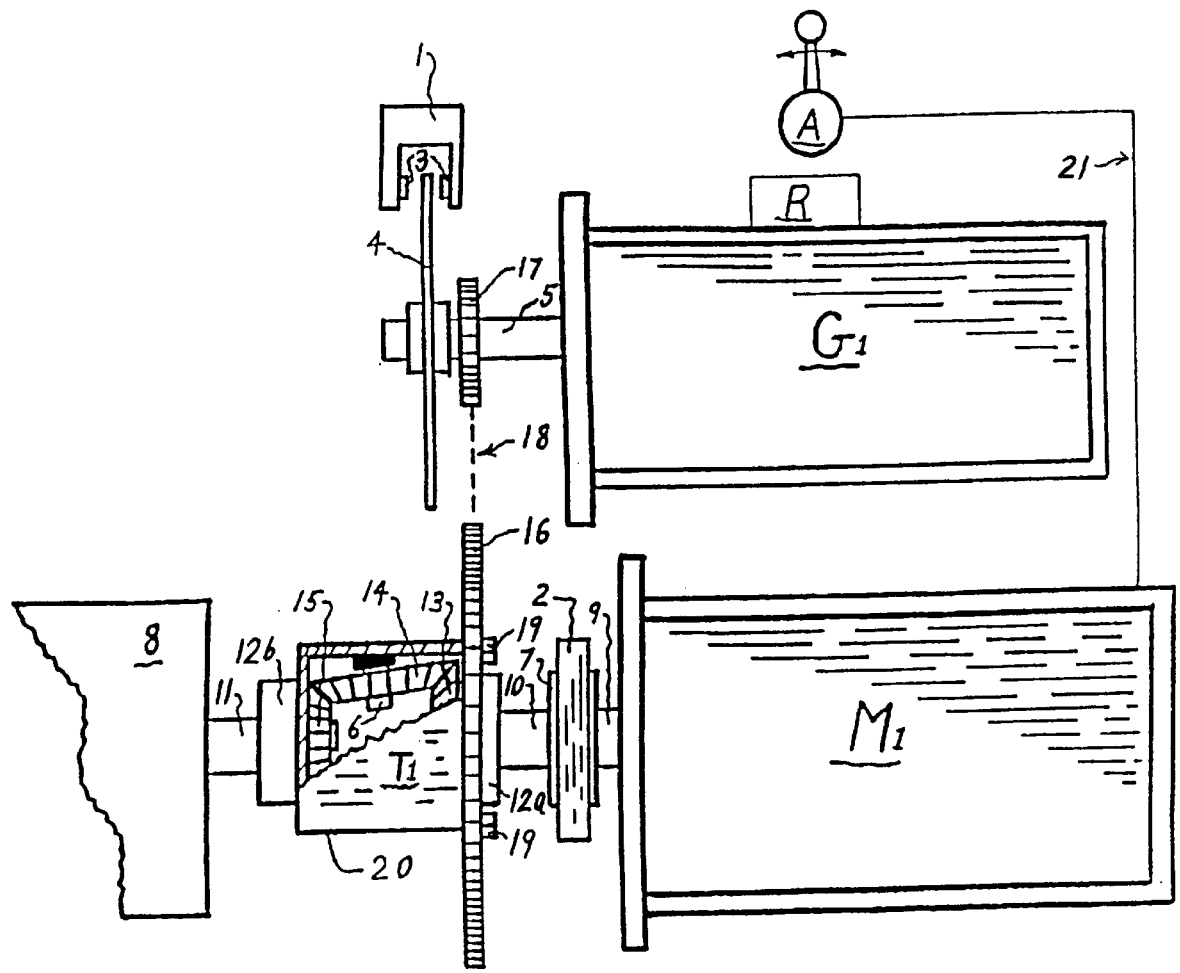
FIG. 1 is a side view illustration of an embodiment of an arrangement of the invention depicting a partial sectional view of a high output planetary drive having an electric motor in arrangement with an electric power regenerative system.

Beginning with FIG. 1, power output shaft 9 of electric motor M1 is illustrated as being coupled by coupling means 7 to drive shaft 10 of planetary transmission T1 and comprises motor brake 2. Drive sprocket 16 is rigidly mounted to housing 20 of the planetary transmission by bolts 19, and engages roller chain 18, depicted in dotted line, which in turn engages driven sprocket 17. Driven sprocket 17 and idler brake disk 4 are rigidly mounted to shaft 5 of generator G1 and brake disc 4 is in enabled arrangement with friction pads 3 of brake caliper 1 for incremental frictional engagement.

Drive shaft 10 is rotatably mounted through bearing 12a in housing 20 of the planetary and comprises rigidly mounted bevel gear 13. Idler shaft 6 is rigidly mounted to the interior surface of transmission housing 20 and comprises rotatably mounted bevel gear 14, the combination comprising an idler wheel member. A corresponding mounted idler shaft and bevel gear, not shown, are arranged on the opposite interior wall of the housing. Output shaft 11 is rotatably mounted through bearing 12b to the housing and bevel gear 15 is rigidly mounted thereto in an arrangement wherein bevel gear 14 and the corresponding bevel gear which is not shown, matingly engage bevel gears 15 and 13. Though not specifically illustrated, it is contemplated the gear assembly is in generally sealed arrangement within the housing and is maintained in oil or the like. Output shaft 11 is shown in a preferred arrangement connected to a speed reducer 8, the output of which is enabled for driving one or more vehicle wheels.

Electric motor M1 is actuated, forward and reverse, by speed selector (accelerator) A through conductor 21 and is preferably enabled for measured output shaft frictional resistance to rotation when not powered from an electric power source (not shown). Motor brake 2 is illustrated as an assist to slow or stop rotation of motor M1 as may be appropriate when motor M1 is not powered.

Generator G1 is enabled and sized for functional efficiency in regeneration of electricity to a battery storage system with rotation of input shaft 5 as driven by sprocket 17, and is enabled for variable positive resistance to rotation of shaft 5, as illustrated by regulator means R.

Upon disengagement of power to motor M1, optionally with assist brake 2 as illustrated, shaft 9 is in measured positive resistant to rotation. When the vehicle is moving, shaft 11 rotates, being driven by vehicle wheel movement. When brake 1 is disengaged from disc 4 and shaft 11 is rotating, transmission housing 20 and/or shaft 10 will turn depending upon whether there is equal, or one or the other has less resistance to turning. When the resistance to turning of shaft 5 connected to generator G1, combined with the resistance to turning of the arrangement comprising the housing and the sprockets connected therebetween to shaft 5, is less than the measured or brake imposed resistance to turning of shaft 9 of motor M1, the generator will generate power in response to vehicle movement.

In powered operation, power output shaft 9 of motor M1 drives shaft 10 and bevel gear 13 rigidly mounted thereto. In a vehicle embodiment wherein output shaft 11 is connected to drive wheels and/or other load which resists rotation, shaft 11 and accordingly bevel gear 15 resists turning. Bevel gear 14, being rotatably mounted to input shaft 6 and engaged with rotation resistant bevel gear 15, rotates about the axis of input shaft 6 and is forced to travel along the path of bevel gear 15 and rotate transmission housing 20. As transmission housing 20 rotates, so does sprocket 16 and through roller chain 18, causes shaft 5 of generator G1 to rotate. As regulator R is actuated, the rotation of shaft 5 is increasingly resisted in scheduled increments, gradually slowing its rotation and starting and incrementally increasing the rotation of shaft 11 from a low gear ratio in respect to the rotation of shaft 10 to a higher gear ratio. Engagement of the idler brake system through caliper 1 and disk 4 is provided as an optional assist to gradually slow and/or stop the rotation of shaft 5.

Incremental activation of regulator R, incrementally increases the resistance to rotation of shaft 5 and preferably is commensurate with incremental increase of the generation of electricity by generator G1. Thus, generation of electricity is increased and decreased as both resistance to rotation of shaft 5 is increased or decreased and/or as the speed of rotation of shaft 5 is increased or decreased. In a preferred embodiment, the regulator R is enabled so that generator G1 is continuously enabled to generate some electricity as long as the vehicle is moving and the transmission is operating below its highest gear ratio at a given motor M1 speed.

Thus, at a selected motor rotational speed, as scheduled engagement of resistance by regulator R meets or exceeds the resistance to rotation of shaft 11, bevel gear 15 begins to move, gradually picking up speed commensurate with the reduction in speed of rotation of transmission housing 20, with shaft 11 incrementally accelerating to its ultimate speed of rotation as an indirect function of the speed of rotation of transmission housing 20 and the relative gear ratio of the planetary arrangement therein.

In the embodiment of FIG. 1, the ratio of bevel gear 13 to bevel gear 15 is illustrated as fairly high, and the planetary transmission drive ratio is illustrated as being about 1:1 if both drive and output shafts have equal rotation, moving to 1:2–3 speed ratio when rotation of the housing is fully stopped. Therefore, starting with a stopped vehicle and engagement of incrementally scheduled rotational resistance to the idler member, shaft 11 will go from a stop, e.g. 0:1 ratio in respect to the input shaft 10 speed to an about 2–3:1 ratio. The rotation of the driven shaft 11 is gradually initiated at its lowest gear ratio in respect to input shaft rotation, at a time when the electric motor is gradually experiencing its greatest torque resistance. Such confluence of events reduces energy use of the electric motor at vehicle movement initiation and reduces the dissipation of stored battery power as compared to movement initiation at higher gear ratios.

If motor speed is increased cooperatively during the gradual scheduled engagement of the idler brake, the vehicle experiences acceleration from both an increase in engine speed and an increase in gear ratio, thus enhancing acceleration.

Figure 2:
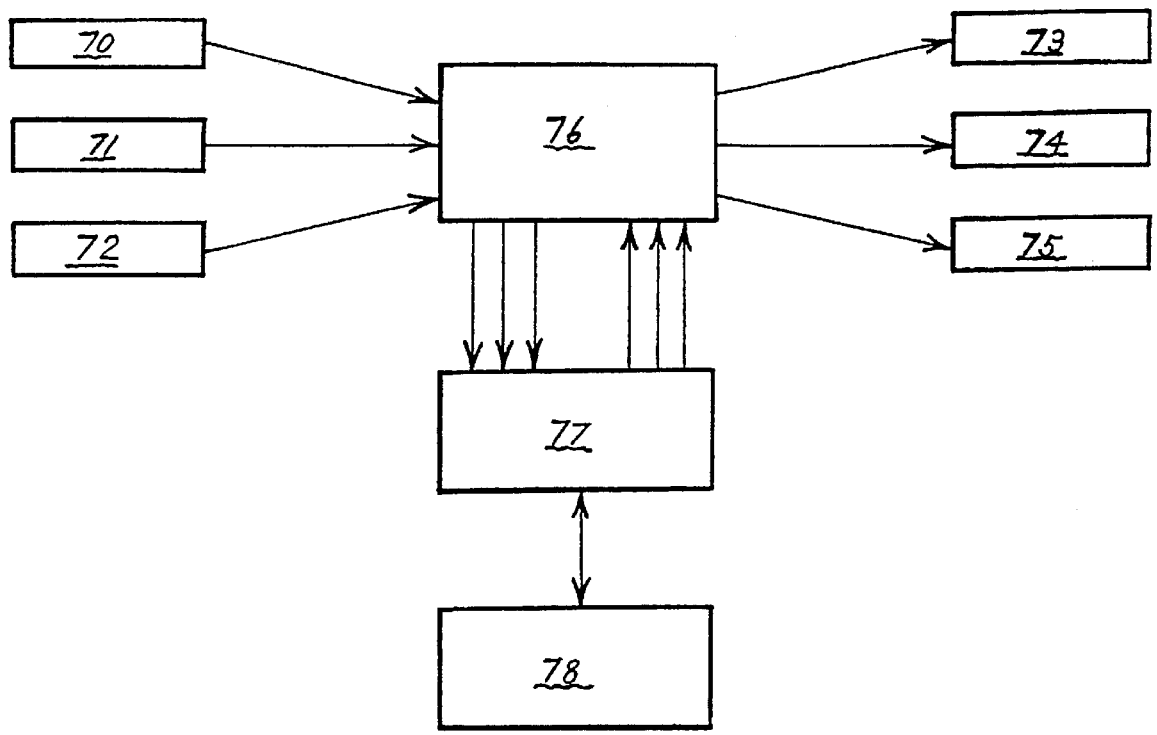
FIG. 2 is a diagrammatic scheme of an embodiment of automatic operation of the arrangement in FIG. 1, responsive to pedal controls commonly used for driver control.

FIG. 2, is a diagrammatic illustration of an automatic computerized system contemplated for cooperatively actuating various components of the system in response to vehicle driving events. Therein, sensing means 70 is illustrated as arranged within the vehicular drive system, preferably at a point forward the output of the planetary transmission, to sense differences in torque and/or speed imposed upon the system by the inertial resistance of the wheels to vehicle load and ret terrain, and relays data regarding same to a central processing unit. The central processing unit generally constitutes a computer or the like, typically comprising micro controller data distribution means 76, data storage means 78 and comparitor/computing means 77. Sensing means 71 and 72 are arranged at the accelerator and brake pedals respectively of the vehicle and sense reactions of the driver to vehicle performance in response to terrain and driving conditions as manifested by accelerator pedal movement and/or brake pedal movement, and relays data regarding same along with data from sensing means 70 to micro controller data distribution means 76. Micro controller 76 identifies, quantifies and digitizes the data and appropriately distributes same to comparitor 77, along with data from data storage means 78. Comparitor 77, compares the data received from sensing means 70, 71 and 72 in respect to data maintained in data storage 78, analyses, computes and generates data in response which is then sent back to micro controller means 76 for identification, qualification and conversion which is then sent to actuators of the idler brake 73, motor brake 74 and the variable resistance imposed by regulator 75, in accord with a programmed schedule.

For example, sensing means 70 senses increased torque resistance from vehicle wheels and/or decreased vehicle speed as a response to an upward grade of driving terrain and senses a driver reaction at sensor 71, noted through incremental movement of accelerator pedal/motor speed selector, seeking increased power to maintain vehicle speed. The micro controller 76 receives data from sensors 70 and 71, digitizes same to an appropriate format for the central data processing unit and sends the digitized data to comparitor 77, together with appropriate data stored in data storage 78, where it is analyzed and an appropriate response is computed. The response is then sent to the micro controller 76 where it is identified for appropriate distribution and converted to data which is sent to initiate a response at regulator 75, the motor speed selector and/or idler brake 73.

Thus, incrementally increased torque sensed by sensor 70 generates data which is compared by comparitor 77 to data received from sensor 71 of an incremental driver response and computed to initiate a programmed schedule to affect a gradual increase in power, which is then sent to the accelerator of the electric motor controlling energy received from battery storage, without change to resistance of rotation imposed by regulator 75 or engagement of idler brake 73, and the motor provides an incremental increase in power to overcome the resistance of the terrain. Alternately, such data may be compared and programmed to simultaneously gradually increase motor speed and gradually increase resistance imposed by regulator 75, thus changing the generator charging rate and decreasing gear ratio, to provide increased power to the wheels without significant change in vehicle speed.

In a similar manner, a driver response may be a significant change in the accelerator position, which data is received from sensor 71 by comparitor 77 and compared to data in storage and initiates a scheduled response for an immediate significant increase in motor speed, with an immediate significant increase in resistance of regulator 75, to provide a change in generator charging rate and movement to a lower gear ratio for increased power to the vehicle wheels, and following such with a decreased resistance imposed by regulator 75, provides a dramatic increase in acceleration from the low gear ratio to a greater gear ratio coupled with an increase in regenerative charging rate.

The driver might disengage the accelerator in contemplation of slowing the vehicle down, such data being sent to the comparitor, compared to vehicle torque from sensor 70 and programming actuation of the motor brake 74 initiating an upward movement in gear ratio gradually slowing the vehicle and increasing generation. As can be seen, generator speed can be kept fairly constant, with variations of generator charging rate and motor speed controlling the transmission gear ratio and vehicle speed.

Figure 3:
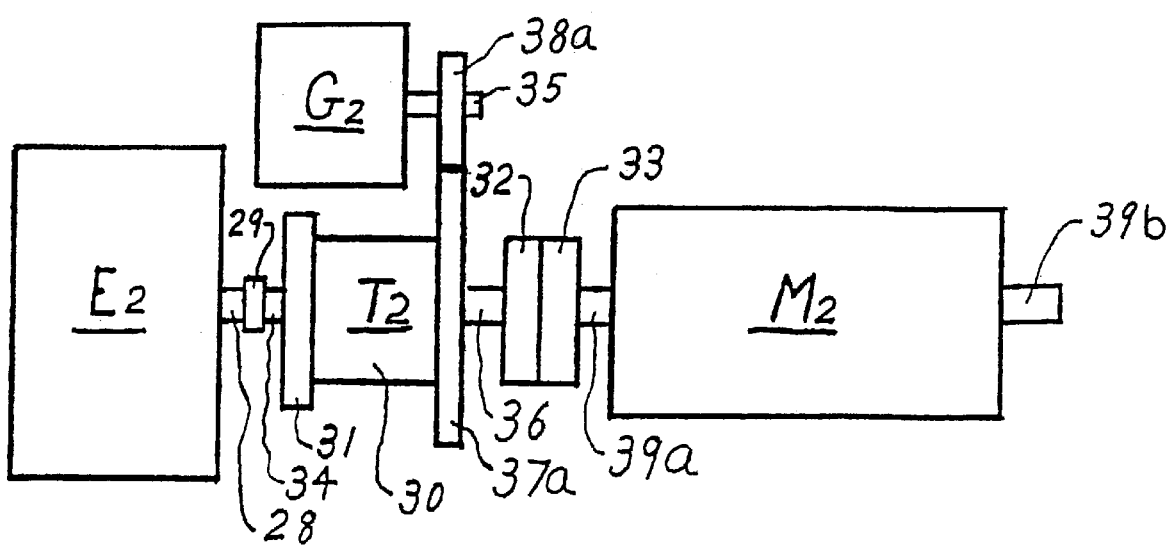
FIG. 3 is a diagrammatic illustration of a hybrid embodiment of the invention depicting a clutch interruption mode between the electric motor and the planetary transmission.

FIG. 3, illustrates a hybrid embodiment wherein an assembly is shown as including an alternate fuel engine E2, a planetary transmission T2, a generator G2 in operative engagement with planetary transmission housing 30, the housing constituting the idler member of the transmission in this embodiment, housing brake 31, and an electric motor M2 powered by a bank of storage batteries which are not shown. In this embodiment, motor M2 comprises an armature which has shaft ends 39a and 39b extending from opposite ends of the motor, with shaft end 39b connecting to a vehicle drive wheel. In this embodiment, the driving shafts of Motor M2, engine E2 and input/output shafts of planetary transmission T2 are arranged along about a common axis.

Shaft end 39a of motor M2 is connected through clutch means 33 with input/output shaft 36 of planetary transmission T2 and input/output shaft 36 comprises braking means 32 enabled to stop rotation of shaft 36. Generator G2 is illustrated as comprising armature shaft 35, which comprises gear 38 which is in mating enabling engagement with drive gear 37 of transmission housing 30. Engine E2 comprises power shaft 28 which is connected 29 to input/output shaft 34 of planetary transmission T2.

In the operation of this embodiment, electric motor M2 is powered by the bank of batteries using any suitable control system in multiple enabled operational scenarios. In one operational scenario, clutch means 33 disengages Motor M2 from the remaining assembly, housing brake 31 is disengaged, braking means 32 is engaged to resist rotation of transmission in/output shaft 36 and engine E2 operates at an efficient constant rotational speed and/or controlled variable speed, to rotate transmission housing 30, thus enabling generator G2 to provide generative power to one or more batteries of the bank of storage batteries and/or to electric motor M2. Such operational scenario is essentially independent of the electric motor operation of the vehicle and can provide controlled generative power while the vehicle is moving or stopped.

In a cooperative further operational scenario, brake 32 is disengaged, planetary transmission brake 31 is enabled for engagement of the transmission housing 30 and clutch means 33 is enabled to engage motor M2 with the transmission assembly. The latter scenario provides a power assist and/or alternative power source embodiment to the assembly wherein upon demand, application of brake 31 enables the planetary transmission to translate the rotational power of alternate fuel engine E2 from rotation of generator G2 to rotation of input/output shaft 36. With incremental scheduled application of brake 31, the rotational movement through the geared ratio of the transmission to output shaft 36 is coordinated, with further assist of clutch means 33, to the rotational movement of the armature of electric motor M2 to enable direct and coordinated application of rotational force from engine E2 to the armature shaft of motor M2 and assist the power being applied to the drive wheel(s).

Such cooperative use scenarios will be effective in situations wherein the electric motor enablement requires a sudden burst of power to the wheels as in passing, climbing steep grades or the like, and/or where the available battery storage has been so depleted as to necessitate assist to maintain sufficient vehicle movement and/or even situations wherein the electric motor is inoperable and the alternate fuel engine is needed as the vehicle driving power source.

Figure 4:
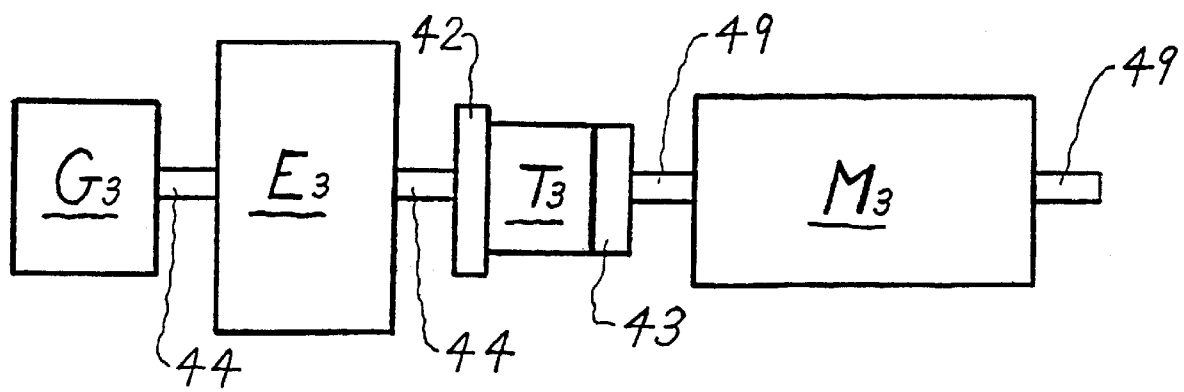
FIG. 4 is a diagrammatic illustration of a further hybrid embodiment of the invention depicting continuous alternate fuel generation of electricity.

FIG. 4, illustrates a further hybrid embodiment wherein an assembly is shown as including an alternate fuel engine E3, a planetary transmission T3, a generator G3 in direct operative enablement with the driven power shaft of the alternate fuel engine, and an electric motor M3. In this embodiment the housing of the planetary drive transmission functions as the idler member and comprises a brake means 42 and an alternate clutch means 43 among the input/output shaft of the planetary transmission and the housing of the planetary transmission.

As with the embodiment of FIG. 3, electric motor M3 may be powered by a bank of batteries using any suitable control system in multiple enabled operational scenarios, but can additionally provide a unique enablement for AC electric motor embodiments which avoids the significant problem associated with AC electric motor start-up. In the embodiment of FIG. 4, the arrangement of transmission and clutch enables the driven shaft of the alternate fuel engine to assist the movement of the through-put shaft of the electric motor at any time, including start-up of the electric motor, while at the same time providing continuously generated AC current directly to the electric motor. Such is particularly effective in preserving start-up power drain from storage battery based AC inverted systems. It is further believed that with appropriate balanced sizing of the alternate fuel engine, AC generator and AC electric motor, coupled with sensitive current control, such arrangement will operate during a significant portion of the average driving experience with little or no power drain on a reserve bank of storage batteries providing inverted AC current thus enabling a significant increase in electric motor range under low alternate fuel demands and with very small reserve battery storage needs.

In non-assisted operation, clutch means 43 disengages Motor M3 from the remaining assembly and engine E3 operates at an efficient constant rotational speed and/or controlled variable speed to enable generator G3, and/or a further generator operative with rotation of the transmission idler member, to provide generative power directly to electric motor M3 and/or to one or more batteries of the bank of storage batteries. Such operational scenario can be essentially independent of the electric motor operation of the vehicle and can provide controlled generative power at different rotational speed from the electric motor while the vehicle is moving or stopped.

In an assisted operational scenario, planetary transmission brake 42 is engaged and clutch means 43 is enabled to engage motor M3 with the transmission assembly. The latter scenario can provide a forward or reverse power assist and/or alternative power source to the assembly wherein upon demand, application of brake 42 enables the planetary transmission to translate rotational power of alternate fuel engine E3 to rotation of a through-put armature shaft of motor M3. With incremental scheduled application of brake 42, the rotational movement through the geared ratio of the transmission is coordinated, with clutch means 43 disengaged, to the rotational movement of the armature shaft of electric motor M3 to enable direct and coordinated application of rotational force from engine E3 to the armature shaft of motor M3 and assist the power being applied to the drive wheel(s).

Optional clutch 43 can also be used to assist motor M3 in reverse. In such scenario, current to the motor is reversed and clutch 43 is enabled, functioning to engage the rotational movement of the transmission housing with the armature of electric motor M3 and provide assisted reverse power to vehicle wheels.

In a preferred example of FIG. 4, motor M3 is a three phase electric motor and generator G3 is a three phase generator. In a functional scenario, alternate fuel engine E3 is operating at a constant fuel efficient speed to enable generator G3. Upon demand, current from G3 is directed to motor M3 to initiate rotation, together with gradual engagement of brake 42 to provide rotational output from transmission T3 to motor M3, the arrangement providing two sources of power to M3 to assist inertial start-up of motor M3. At a point when inertial start-up has reached a reduced electric power demand, the rotational assist through the transmission is disengaged by disengagement of brake 42 and the power to the wheels of the vehicle is provided solely by the electric motor, using electricity supplied by generator G3. Upon reaching a terrain and/or driving condition change requiring assist to the electric motor M3 for driving performance, brake 42 is engaged and the transmission again provides rotational assist from alternate fuel engine E3.

As with the previous embodiment, such cooperative use scenarios will be effective in situations wherein the electric motor enablement requires a sudden burst of power to the wheels as in passing, climbing steep grades or the like, and/or where an available battery storage has been so depleted as to necessitate assist to maintain sufficient vehicle movement and/or even situations wherein the electric motor is inoperable and the alternate fuel engine is needed as the vehicle driving power source.

Figure 5:
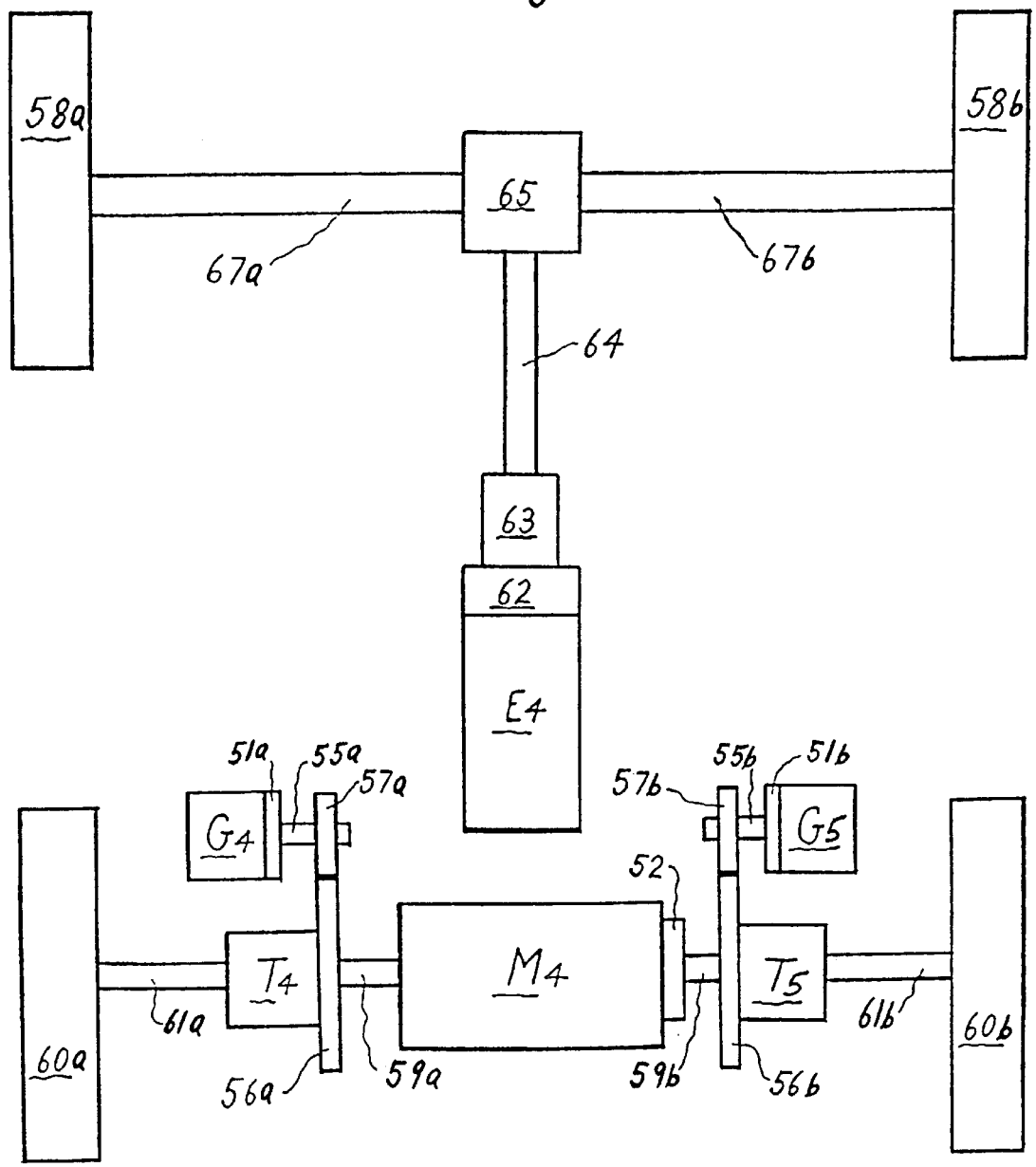
FIG. 5 is a diagrammatic illustration of a hybrid embodiment of the invention depicting a separate axle functional arrangement of the invention.

FIG. 5, illustrates still another hybrid embodiment wherein a vehicle comprises independently functioning electric motor drive and alternate fuel engine drive assemblies. In this embodiment, a 4 wheeled vehicle is shown comprising electric motor powered front wheels and alternate fuel powered rear wheels.

The rear wheel assembly is illustrated as a conventional vehicle drive assembly being an alternate fuel engine E4, connected through clutch means 62 to drive a transmission 63 the output of which is connected through drive shaft 64 to a conventional rear differential 65, which through axles 67a and 67b drive vehicle rear wheels 58a and 58b. Such assembly is operable independent of the electric motor drive system and accordingly can be of any convenient sizing.

The front wheel assembly is illustrated as comprising electric motor M4, having a through-put armature shaft having end 59a connected to a first assembly comprising a planetary drive transmission T4 and generator G4 arranged to drive front wheel 60a, and armature shaft end 59b connected to second assembly comprising a comprising a planetary drive transmission T5 and generator G5 arranged to drive front wheel 60b.

Gear means 56a comprises the idler member of transmission T4 and is arranged to drive mating gear means 57a mounted to shaft 55a of generator G4, which comprises brake means 51a. Gear means 56b comprises the idler member of transmission T5 and is arranged to drive mating gear means 57b mounted to shaft 55b of generator G5, which comprises brake means 51b.

In an operating scenario wherein alternate fuel engine E4 alone is driving the vehicle, wheels 60a and 60b turn with movement of the vehicle. If electric motor brake 52 is engaged and generator brakes 51a and 51b disengaged, generators T4 and T5 provide constant maximum regenerative energy to the battery storage bank, depending upon vehicle speed and relative turning circumferences of the front wheels, as well as any regeneration provided by generator means separately connected to engine E4.

In an operating scenario wherein the electric motor alone is driving the vehicle, the functional operation, including regeneration, is as described in FIG. 1, together with any regeneration provided by non-driving engine E4.

Figure 6:
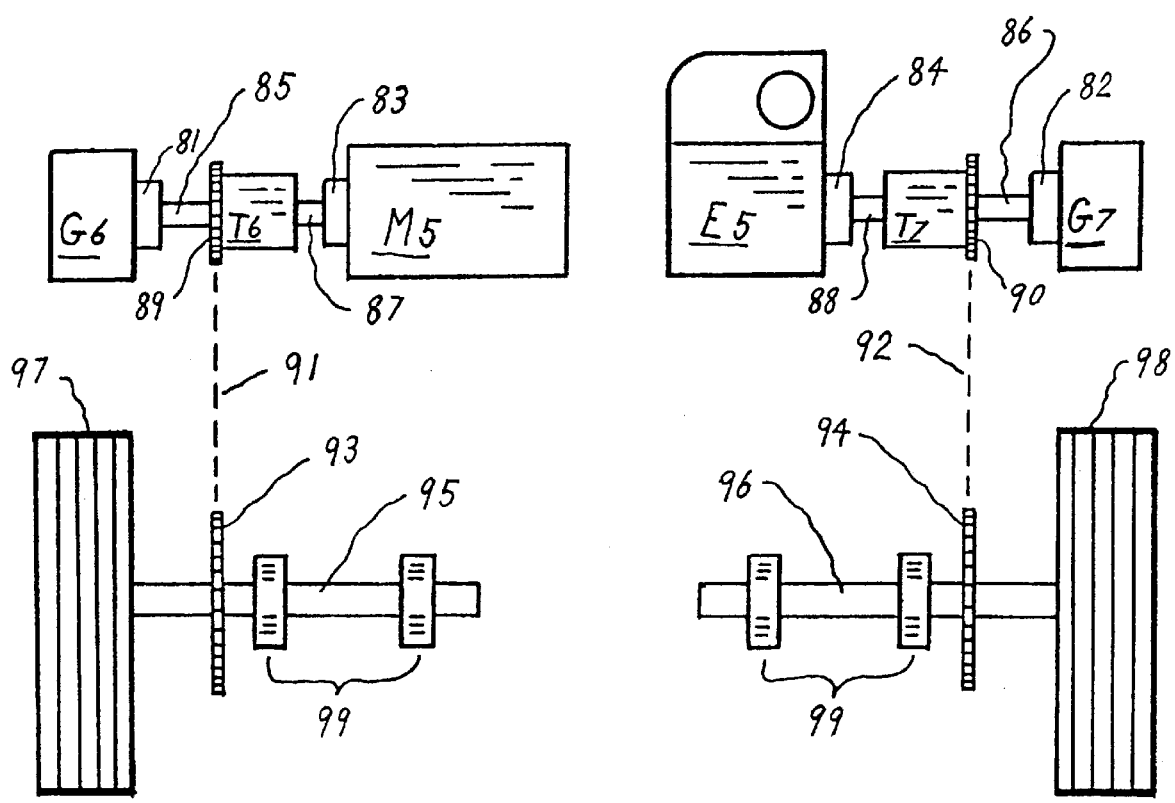
FIG. 6 is a diagrammatic illustration of a hybrid embodiment of the invention depicting a further separate axle functional arrangement of the invention.

FIG. 6, illustrates still another hybrid embodiment wherein a vehicle comprises independently functioning electric motor drive and alternate fuel engine drive assemblies. In this embodiment, the electric motor independently drives a wheel one side of a split axle and the alternate fuel engine a wheel on the other.

Therein, alternate fuel engine E5, is depicted as connected through output shaft 88 to planetary transmission T7, which comprises idler shaft 86 and output drive 90. In this scenario, the housing of the planetary transmission is rotatable, and output drive 90 comprises means, such as a sprocket or the like, fixed to the housing for rotation with the housing. Chain means 92 is provided to drive sprocket 94 of axle 96 to which wheel 98 is connected, axle 96 being supported by bearings 99. Shaft 86 is connected to the armature of generator G7, and comprises brake means 82 to resist the rotation thereof. Shaft 88 comprises brake means 84 to resist the rotation thereof.

In functional operation when brake means 82 is engaged and engine E5 is running shaft 88 and sprocket 90 of the planetary transmission will rotate and drive shaft 96 and wheel 98 connected thereto. When wheel 98 is rotating and brake 82 is disengaged, if shaft 88 is prevented from rotating by either or both of internal resistance of the engine and/or brake 84, shaft 86 will rotate and generator G7 will regenerate electricity.

Similarly, electric motor M5, is depicted as connected through output shaft 87 to planetary transmission T6, which comprises idler shaft 85 and output drive 89. In this scenario, the housing of the planetary transmission is also rotatable, and output drive 89 comprises means, such as a sprocket or the like, fixed to the housing for rotation with the housing. Chain means 91 is provided to drive sprocket 93 of axle 95 to which wheel 97 is connected, axle 95 being supported by bearings 99. Shaft 85 is connected to the armature of generator G6, and comprises brake means 81 to resist the rotation thereof. Shaft 87 comprises brake means 83 to resist the rotation thereof.

Similarly, in functional operation when brake means 81 is engaged and electric motor M5 is running, shaft 87 and sprocket 89 of the planetary transmission will rotate and drive shaft 95 and wheel 97 connected thereto. When wheel 97 is rotating and brake 81 is disengaged, if shaft 87 is prevented from rotating by either or both of internal resistance of the electric motor and/or brake 83, shaft 85 will rotate and generator G6 will regenerate electricity.

As should be apparent, such arrangement on different wheels of a split axle allows either wheel to be driven at different rotational speeds from the other providing a multitude of benefits for powering and steering a vehicle. Thus, in one operating mode, the alternate fuel engine an be the sole source of driving power going to wheel 98, with wheel 97 turning with the motion of the vehicle and regenerating electricity through generator G6. In another operating mode, the electric motor is the sole source of driving power going to wheel 97, with wheel 98 turning with the motion of the vehicle and regenerating electricity through generator G7. In still another operating embodiment, both electric motor M5 and alternate fuel engine E5 power their respective wheels at the same speed. In yet another operating embodiment, the electric motor M5 and alternate fuel engine E5 rotate their respective output shafts at different speeds, enabling the faster of the rotating shafts to be translated through its respective planetary transmission to generate electricity while also providing power to its respective wheel.

Figure 7:
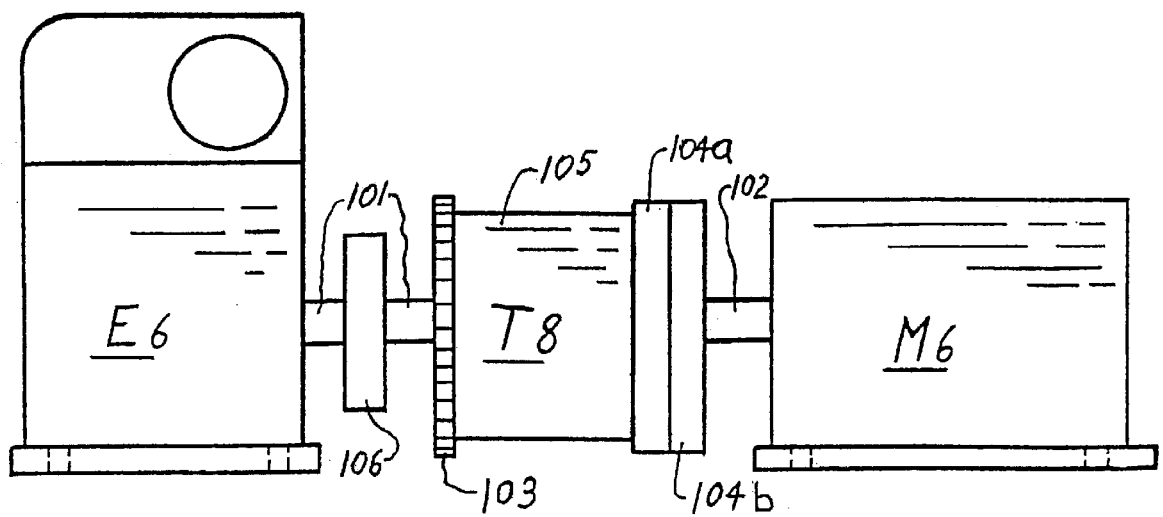
FIG. 7 is a diagrammatic illustration of a hybrid embodiment of the invention depicting a further clutch interruption mode between the electric motor and the planetary transmission.

FIG. 7, illustrates a hybrid embodiment similar to FIG. 3 wherein an assembly is shown as including an alternate fuel engine E6, a planetary transmission T8 and an electric motor M6 in operational alignment. Therein, the planetary transmission housing 105 is rotatable and constitutes the output member of the transmission, comprising a sprocket or the like means 103 which is interconnected to drive a one or more wheels of a vehicle. In this embodiment, shaft 101 is driven by alternate fuel engine E6 and comprises an input/output shaft of the transmission. Shaft 102 is driven by electric motor M6 and also comprises an input/output shaft of the transmission. Friction brake means 106, is arranged to resist the rotation of shaft 101 while clutch 104a/104b is arranged along shaft 102 to engage and disengage the rotation of shaft 102 with housing 105.

In this embodiment, electric motor M6 is preferably a permanent magnet motor enabled to function as a motor when an electric current is imposed upon it, a generator when the shaft is turned without current enablement to the motor, and also as a generator when the shaft of the motor is rotated faster than the enabling speed imposed by a current driving the motor. In the embodiment of FIG. 7, when engine E6 is stopped with brake 106 engaged, clutch 104a/104b is disengaged, and electric motor M6 is enabled, shaft 102 rotates and the housing is drivenly rotated at a reduced geared rotation to drive the vehicle wheel. When clutch 104a/104b is gradually engaged, the rotation of the housing incrementally increases to the rotational speed of shaft 102, with motor M6 providing 1:1 rotation of the housing and thus direct drive output to the vehicle wheels.

When brake 106 is sequentially disengaged and alternate fuel engine E6 is started to drive shaft 101, with clutch 104a/104b engaged and motor M6 activated, both the electric motor and the alternate fuel engine can provide full power to the housing in a direct drive output to the vehicle driven wheel. It is pointed out that in such sequence, as the RPM's of alternate engine E6 increase from a stop to the speed of rotation of motor M6, the rotation of shaft 101 provides power to the housing, incrementally increasing from a reduced geared ratio to the direct drive speed of the housing.

If the rotational speed of shaft 101, powered by engine E6, exceeds the rotational speed of shaft 102, permanent magnet electric motor M6 automatically becomes a generator for regenerating electricity in battery storage. If engine E6 is stopped with brake 106 engaged, and electric motor M6 is enabled in reverse polarity, shaft 102 rotates in reverse direction and the housing is drivenly rotated at a reduced geared ratio to drive the vehicle wheel in reverse.

It should be understood that many planetary drive types can be used and modifications of the combination arrangement with a planetary transmission are within the contemplation of the invention. For example, operation of the vehicle in a cruise control embodiment can be automatic with data from the sensors being compared to a constant speed. The idler member or the like can comprise a flywheel or the like to extend generation of electricity. Either or both brakes can be hydraulic, air, mechanical, electric brake or the like. The roller chain or sprockets can be replaced with gears, belts or other drive means.

It is contemplated the basic premise of the invention can be extended to other transmission arrangements which may be utilized in an electric powered wheeled vehicle. Thus, it is contemplated as within the present invention to connect an electric generating means directly to the electric motor or at any geared output thereof for intermittent or continuous regeneration of electric output to a power storage means.

I claim:

1. A vehicle comprising an alternate power engine arranged to drive a first wheel, and an electric motor, electrical power storage means, generating means and transmission means in operable enablement to drive a second wheel wherein:

said power storage means is an arrangement providing electrical power to said electric motor;

said transmission comprises a planetary drive means having an idler member rotatably engaged between rotatable first and second drive means, said first drive means being arranged to be driven by said electric motor and said idler member being arranged to transfer power between said first and second drive means, from a fast speed with low torque to a slower speed with high torque, by means controlling the rotation of said idler member in scheduled increments;

said second drive means being arranged to drive said second wheel of said vehicle; and said generating means being in electrical circuitry for regeneration of electrical power in said power storage means, and is arranged to generate electricity by means resisting the rotation of said idler member.

2. A vehicle of claim 1 wherein said means controlling the rotation of said idler member comprises means regulating current generated by said generator.

3. A vehicle of claim 1 wherein said means for controlling the rotation of said idler member comprises friction brake means.

4. A vehicle of claim 1, wherein said means for controlling the rotation of said idler member comprises computer control means.

5. A vehicle of claim 1 wherein movement of said idler member is driven by rotation of said second drive means in response to movement of said vehicle.

6. A vehicle of claim 1 wherein movement of said idler member is driven by rotation of said first drive means in response to rotation of a shaft of said electric motor.

7. A vehicle of claim 1, wherein said electric motor is enabled for different speeds and rotational direction reversal.

8. A vehicle of claim 1 wherein said planetary drive comprises a first wheel member rotatably mounted on an idler shaft, a third wheel member rigidly mounted to a first drive shaft, a second wheel member rigidly mounted to a second drive shaft, wherein said idler shaft is mounted to a housing which rotates about an axis of said first drive shaft and is arranged to enable said generating means.

9. A vehicle of claim 1 wherein said alternate power engine drives a first rotatable drive means of a further planetary drive transmission wherein said second rotatable drive means comprises a rotatable housing engaged between said first rotatable drive means and a rotatable idler member, said rotatable idler member is connected to a generator, and said rotatable housing is in enabling arrangement to drive a different wheel from that driven by said electric motor.

10. A vehicle of claim 1 wherein said alternate power engine is arranged to drive a wheel on an axis spaced from the axis of said wheel driven by said second drive means of said planetary drive.

11. A vehicle of claim 5, comprising brake means arranged to stop rotation of said first drive means.

12. A vehicle of claim 8, wherein said planetary drive wheel members are gears.

13. A vehicle of claim 12, wherein said planetary drive first drive means, idler member and said second drive means are arranged in a speed ratio which increases from about 1:1 to about 1:3.

14. A vehicle of claim 9 wherein said wheel driven by said rotatable housing of said further planetary drive transmission, and said wheel driven by said electric motor, are arranged on separate axles.

15. The combination comprising a wheeled vehicle, an electric motor, electric generator, electrical power storage means and a transmission means, said transmission means comprising input means arranged to be rotatably driven by said electric motor, an idler member rotatably driven by said input means and output means driven by said idler member at variable ratios of rotation in respect to rotation of said input means, wherein said output means is arranged to drive a wheel of said vehicle, and said generator is arranged to generate electricity in response to resistance imposed upon the rotation of said idler member.

16. The combination of claim 15 comprising sensing means arranged to sense at least one of variation in vehicle resistance to inertial movement and vehicle driver's response, and computer means arranged to receive data from said sensing means, compute a response to said data, and initiate a response comprising at least one of power input to said electric motor and generating output of said generator.

17. A wheeled vehicle comprising an alternate fuel engine, a transmission having an input means in operable enablement with a rotatable output means of said engine, an electric motor comprising a motor driven shaft in operable enablement with a rotatable output means of said transmission wherein said transmission comprises a planetary drive having a rotatable idler member engaged between first and second transmission drive means, said electric motor comprises a motor driven shaft having first and second ends, said first end being in enabling arrangement to drive a wheel of said vehicle, said second end being in enabling arrangement to drive said second transmission drive means of said planetary drive transmission; and wherein said alternate fuel engine comprises an engine driven shaft in enabling arrangement to drive said first transmission drive means.

18. A wheeled vehicle of claim 17 wherein said electric motor is an AC motor and said alternate fuel engine drives an AC generator which provides electric current to said electric motor.

19. A wheeled vehicle of claim 17 wherein said idler member is arranged to transfer power between said first and second drive means, from a fast speed with low torque to slow speed with high torque, by means controlling the rotation of said idler member, a generating means is in electrical circuitry for regeneration of electrical power in said power storage means, said generating means being arranged to generate electricity by means resisting the rotation of said idler member.

20. A wheeled vehicle comprising an alternate fuel engine, a transmission having an input means in operable enablement with a rotatable output means of said engine, an electric motor comprising a motor driven shaft in operable enablement with a rotatable output means of said transmission wherein said transmission comprises a planetary drive transmission having a rotatable housing arranged between first and second rotatable drive shafts, said second rotatable drive shaft is arranged to engage and disengage in direct rotation with said rotatable housing by clutch means, said alternate fuel engine is connected to drive said first rotatable drive shaft, said electric motor is connected to drive said second rotatable shaft and said rotatable housing is in enabling arrangement to drive a wheel of said vehicle.

21. A wheeled vehicle of claim 20 wherein said electric motor comprises a permanent magnet.

22. A wheeled vehicle of claim 20 comprising brake means arranged to resist the rotation of said first rotatable drive shaft.

23. A wheeled vehicle of claim 20 wherein said electric motor is an AC motor.

* * * * *